(12) United States Patent
Pfeiffer

(10) Patent No.: US 6,729,463 B2
(45) Date of Patent: May 4, 2004

(54) CONVEYOR WITH FLEXIBLE ZONE PARAMETER CONTROL

(75) Inventor: Michael W. Pfeiffer, Richfield, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 10/267,022

(22) Filed: Oct. 7, 2002

(65) Prior Publication Data

US 2003/0089580 A1 May 15, 2003

Related U.S. Application Data

(63) Continuation-in-part of application No. 09/717,780, filed on Nov. 21, 2000, now Pat. No. 6,460,683.
(60) Provisional application No. 60/166,808, filed on Nov. 22, 1999.

(51) Int. Cl.[7] .................. B65G 43/00; B65G 47/26; B65G 47/31; B65G 43/10; B65G 13/06
(52) U.S. Cl. .............. 198/460.1; 198/575; 198/781.05
(58) Field of Search ............ 198/460.1, 460.3, 198/575, 781.06, 781.05

(56) References Cited

U.S. PATENT DOCUMENTS

| | | | |
|---|---|---|---|
| 3,716,129 A | 2/1973 | Sadler, Jr. ............... | 198/127 |
| 4,793,262 A | 12/1988 | Horn ........................ | 104/168 |
| 5,076,420 A | 12/1991 | Kuschel ................... | 198/781 |
| 5,086,910 A | 2/1992 | Terpstra ................... | 198/572 |
| 5,211,281 A | 5/1993 | Almes ...................... | 198/781 |
| 5,285,887 A | 2/1994 | Hall ......................... | 198/460 |
| 5,318,167 A | 6/1994 | Bronson et al. ........... | 198/577 |
| 5,456,347 A | 10/1995 | Best et al. ............. | 198/781.06 |
| 5,558,206 A | 9/1996 | Helgerson et al. ..... | 198/781.04 |
| 5,582,286 A | 12/1996 | Kalm et al. ............ | 198/781.06 |
| 5,730,274 A | 3/1998 | Loomer ................... | 198/460.1 |
| 5,862,907 A | 1/1999 | Taylor ................... | 198/781.05 |
| 5,904,239 A | 5/1999 | Narisawa ................ | 198/783 |
| 5,960,930 A | 10/1999 | Hawkins ................ | 198/577 |
| 5,971,137 A | 10/1999 | Grant et al. ............ | 198/782 |
| 6,021,888 A | 2/2000 | Itoh et al. ............... | 198/783 |
| 6,047,812 A | 4/2000 | Horn et al. ............ | 198/781.06 |
| 6,253,906 B1 * | 7/2001 | Hall ........................ | 198/460.1 |
| 6,302,266 B1 | 10/2001 | DeFrancisco et al. .. | 198/781.06 |
| 6,315,104 B1 | 11/2001 | Ebert ...................... | 198/460.1 |

* cited by examiner

*Primary Examiner*—Gene O. Crawford
(74) *Attorney, Agent, or Firm*—Westman, Champlin & Kelly, P.A.

(57) ABSTRACT

A conveyor with flexible zone parameter control. A flexible zone conveyor includes a zone address interface coupled to a plurality of motors to configure at least one zone control unit or control zone to control a designated series of motors along a conveyor path to provide a flexible control zone adaptable for different applications. Control parameters for the control zone can be user inputted or automatically defined for flexible operating control.

33 Claims, 17 Drawing Sheets

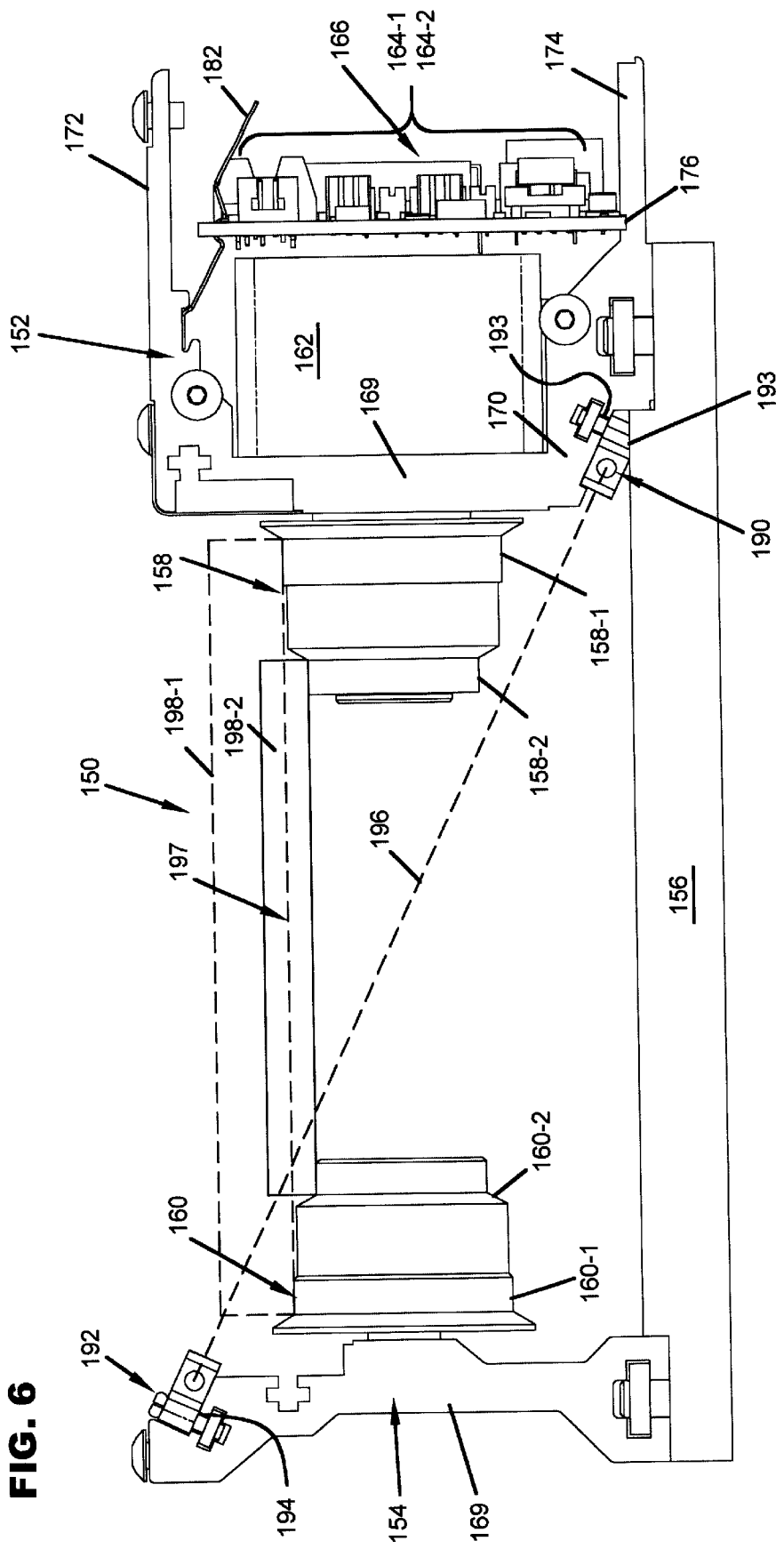

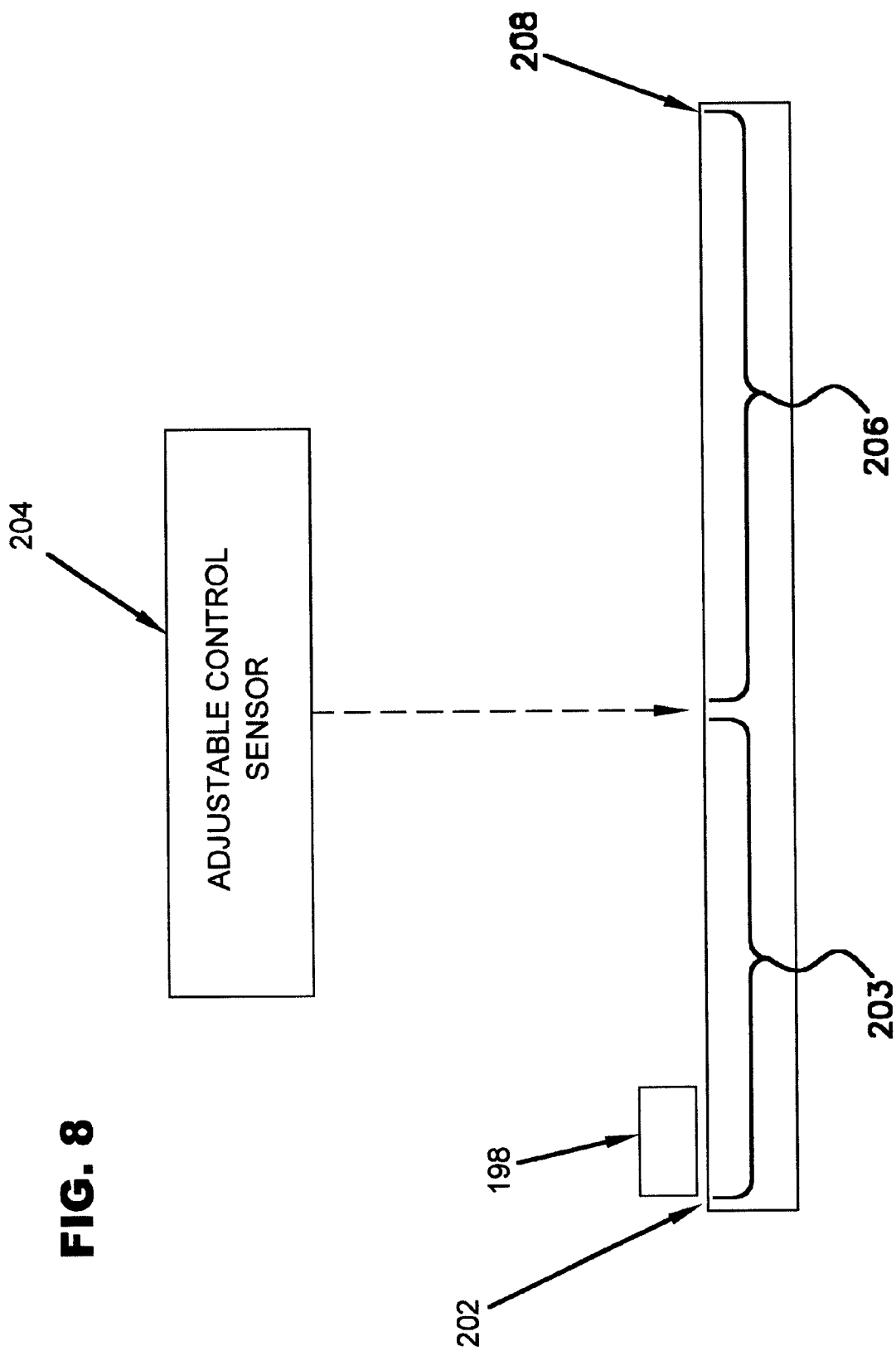

CONVEYOR WITH FLEXIBLE ZONE PARAMETER CONTROL

CROSS-REFERENCE TO RELATED APPLICATION

The present application is a Continuation-In-Part of application Ser. No. 09/717,780 filed Nov. 21, 2000 now U.S. Pat. No. 6,460,683, entitled "CONVEYOR WITH FLEXIBLE ZONE PARAMETER CONTROL", which claims priority to Provisional Application Serial No. 60/166,808, filed Nov. 22, 1999, entitled "ROLLER CONVEYOR WITH FLEXIBLE ZONE PARAMETER CONTROL".

FIELD OF THE INVENTION

The present invention relates to a conveyor with zone control. In particular, the present invention relates to a conveyor with flexible zone control.

BACKGROUND OF THE INVENTION

Automated manufacturing systems use conveyors to carry a workpiece or product along a conveyor path to various stations for manufacture or assembly. Workpieces are deposited to the conveyor and intermittently moved along the conveyor to various operation stations for manufacture or assembly. During assembly operations it is desirable to sequence movement of the workpieces along the conveyor path to maintain sufficient workpiece spacing so that workpieces do not stack up or crash into one another while the workpieces are stopped at various stations for assembly.

Prior conveyor systems incorporate zone control systems for controlling movement of workpieces or units along the conveyor path. The conveyor path is divided into multiple fixed control zones. Each fixed control zone includes at least one drive mechanism for moving workpieces or units in the zone and at least one sensor for controlling operation of the drive mechanism in the zone or adjacent zones. Zone length or size is configured based upon workpiece size or length. Thus, use of the zoned conveyor is limited to the particular product or unit size for which the conveyor has been configured and does not provide flexibility for different products or workpiece sizes. For example, different form factor disc drives and drive components have different dimension sizes, and thus fixed zone conveyors do not provide flexibility for use for different form factor drives and components. The present invention addresses these and other problems and offers solutions and advantages over the prior art.

SUMMARY OF THE INVENTION

The present invention relates to a conveyor system with flexible zone parameter control which provides flexibility for use with different units or workpieces having different dimensions and sizes. The conveyor system includes a zone control assembly to configure zone control units or control zones to provide flexible zone parameters for conveying products or materials for manufacture or for other purposes such as distribution and sorting.

BRIEF DESCRIPTION OF THE DRAWINGS

FIGS. 3-1 and 3-2 are schematic illustrations of an embodiment of a user address interface system for flexible zone control.

FIG. 5-1 is a detailed illustration of an embodiment of a zone control unit.

FIG. 6-1 is an end view of the conveyor section of FIG. 5 illustrating an alternate sensor embodiment.

FIG. 8 is a schematic illustration of an embodiment of a flexible control zone.

DETAILED DESCRIPTION OF ILLUSTRATIVE EMBODIMENTS

Figure 1:
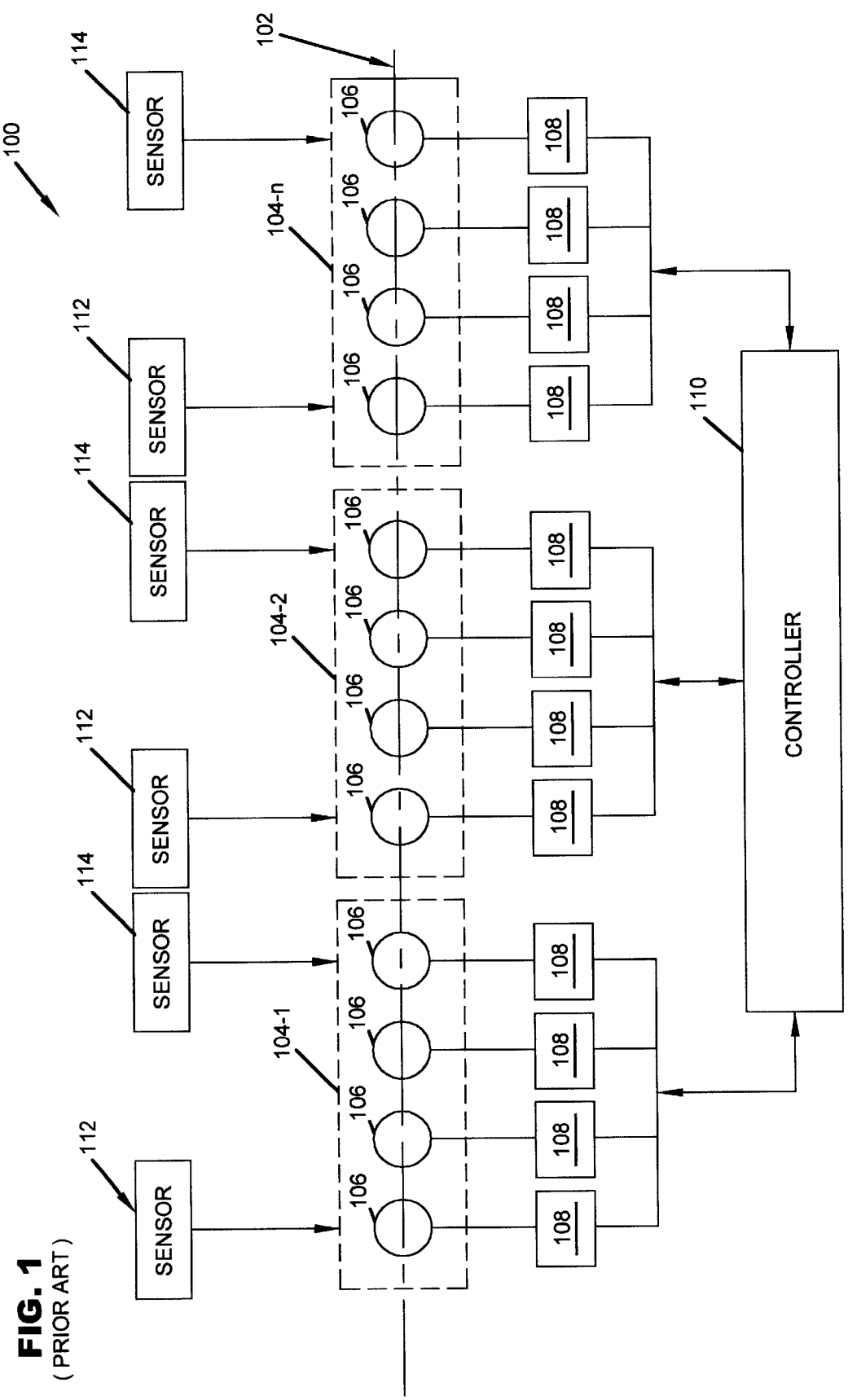
FIG. 1 is a schematic illustration of a zone control system of the prior art.

FIG. 1 schematically illustrates prior conveyor systems 100 having zone control. The conveyor system 100 conveys a workpiece or unit (not shown) along a conveyor path as illustrated by line 102 in FIG. 1. As shown, the conveyor path 102 includes a plurality of fixed control zones 104-1, 104-2, 104-$n$ as schematically illustrated. Each zone 104-1, 104-2, 104-$n$ includes a plurality of rollers 106 driven by motors 108 as illustrated diagrammatically. The motors 108 are operably coupled to a controller 110. The controller 110 synchronously controls each of the motors 108 in the separate zones 104-1, 104-2, 104-$n$ based upon sensed feedback from fixed sensors 112, 114 in each zone. The controller 110 coordinates operation of the motors 108 in each of the control zones 104-1, 104-2, 104-$n$ so that the motors 108 in each zone functionally operate as a single fixed drive unit to form fixed control zones 104-1, 104-2, 104-$n$.

Figure 2:
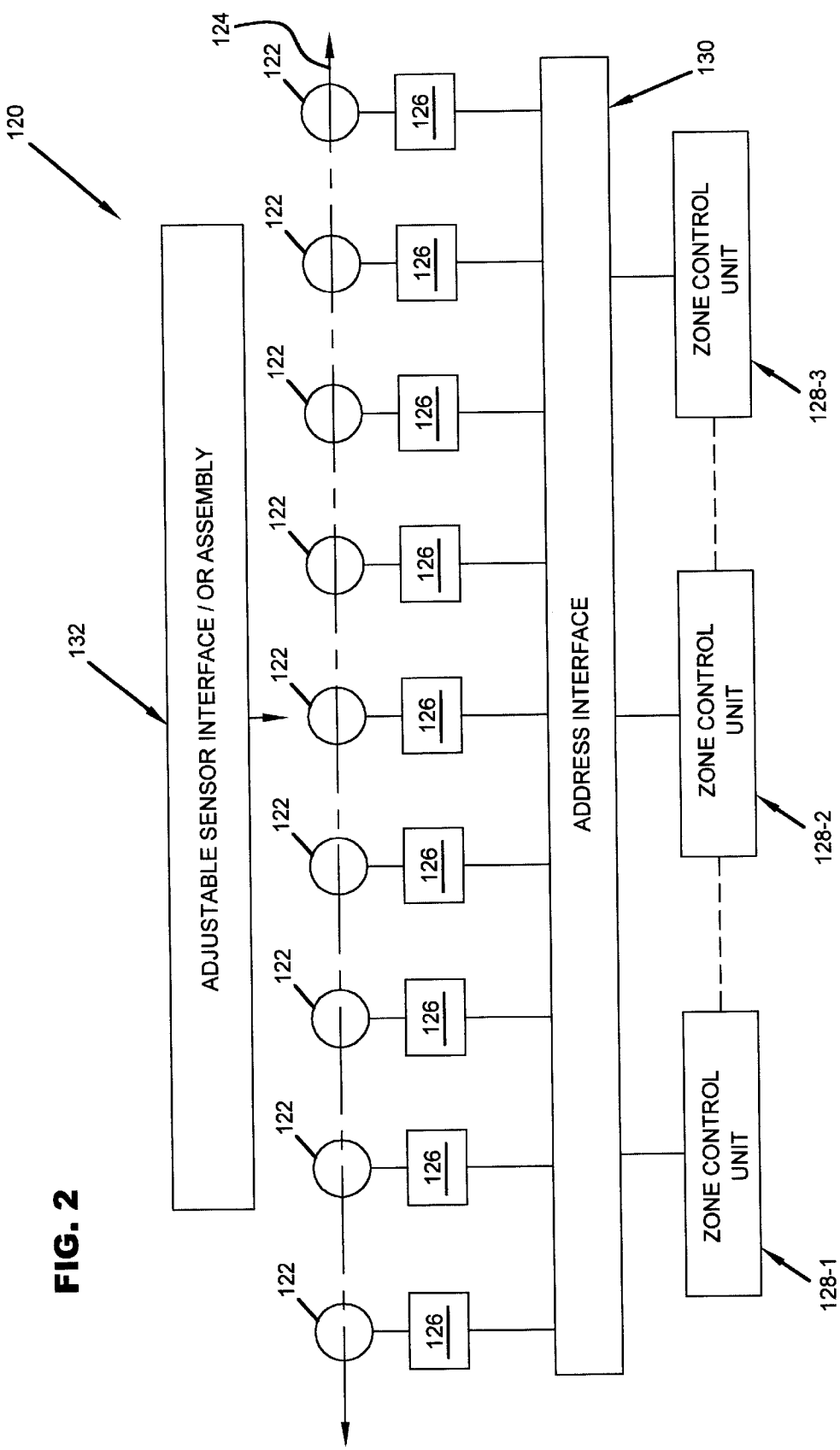
FIG. 2 is a schematic illustration of an embodiment of a flexible zone control system of the present invention.

FIG. 2 schematically illustrates an embodiment of a flexible zone control system or conveyor 120 of the present invention. As shown, the system 120 includes a plurality of rollers 122 or rotating conveyor element extending along a conveyor path 124. Rollers 122 are supported between opposed rails (not shown). In the embodiment shown, each roller 122 is separately operated by a motor 126. Operation of each of the motors 126 is controlled by at least one of a plurality of flexible zone control units or control zones 128-1, 128-2, 128-$n$ to form a plurality of separate control zones along the length of the conveyor path 124. Each of the zone control units or control zones 128 controls a designated series of motors 126 so that the designated series of motors 126 functionally operate as a single drive unit as will be explained.

The number of designated motors 126 (or rollers 122) coupled to each zone control unit or system 128 determines the length of the control zone. The desired control zone length depends upon the size or parameters of the workpiece or unit conveyed. Preferably, larger workpieces require longer control zones than smaller workpieces. As described, each zone control unit 128 operates a designated series of motors 126 and the particular designation of motors 126 can be adjusted to adjust the control zone length or parameters depending upon the particular control application for flexible zone control. Flexible zone control of the present invention provides advantages and features over prior conveyors or conveyor systems.

As illustrated diagrammatically, the control system includes an address interface 130 to configure the zone control units 128 to control a particular designated series of motors 126 depending upon the particular control application. In the illustrated embodiment, the address interface 130 provides an interface to configure the zone control units or control zone 128-1, 128-2, 128-n to control designated series of motors depending upon the application. As also shown, the control system includes an adjustable sensor interface or sensor assembly 132 to provide adjustable sensor control based upon the particular zone configuration for zone control feedback.

Figures 1, 3:
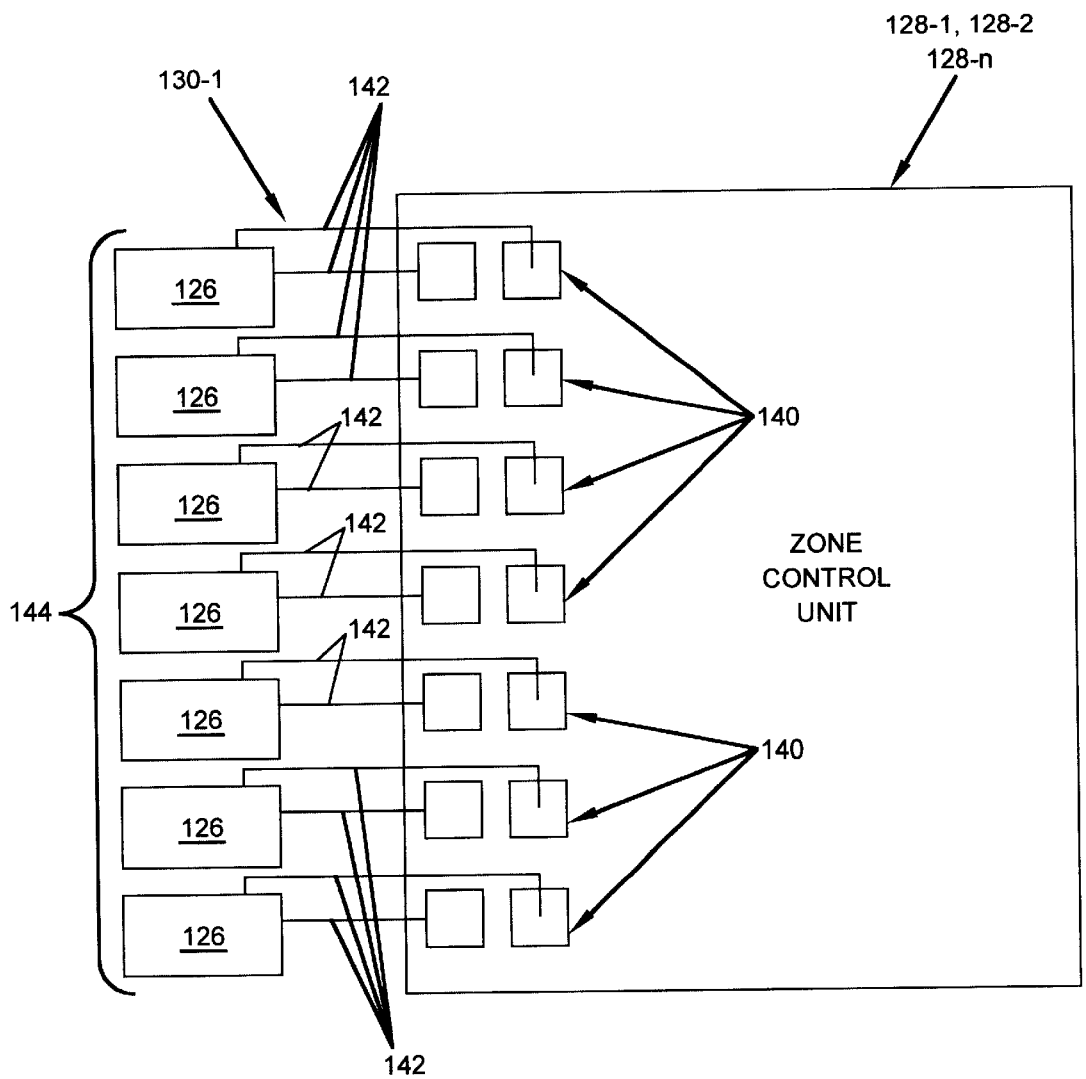
Figures 2, 3:
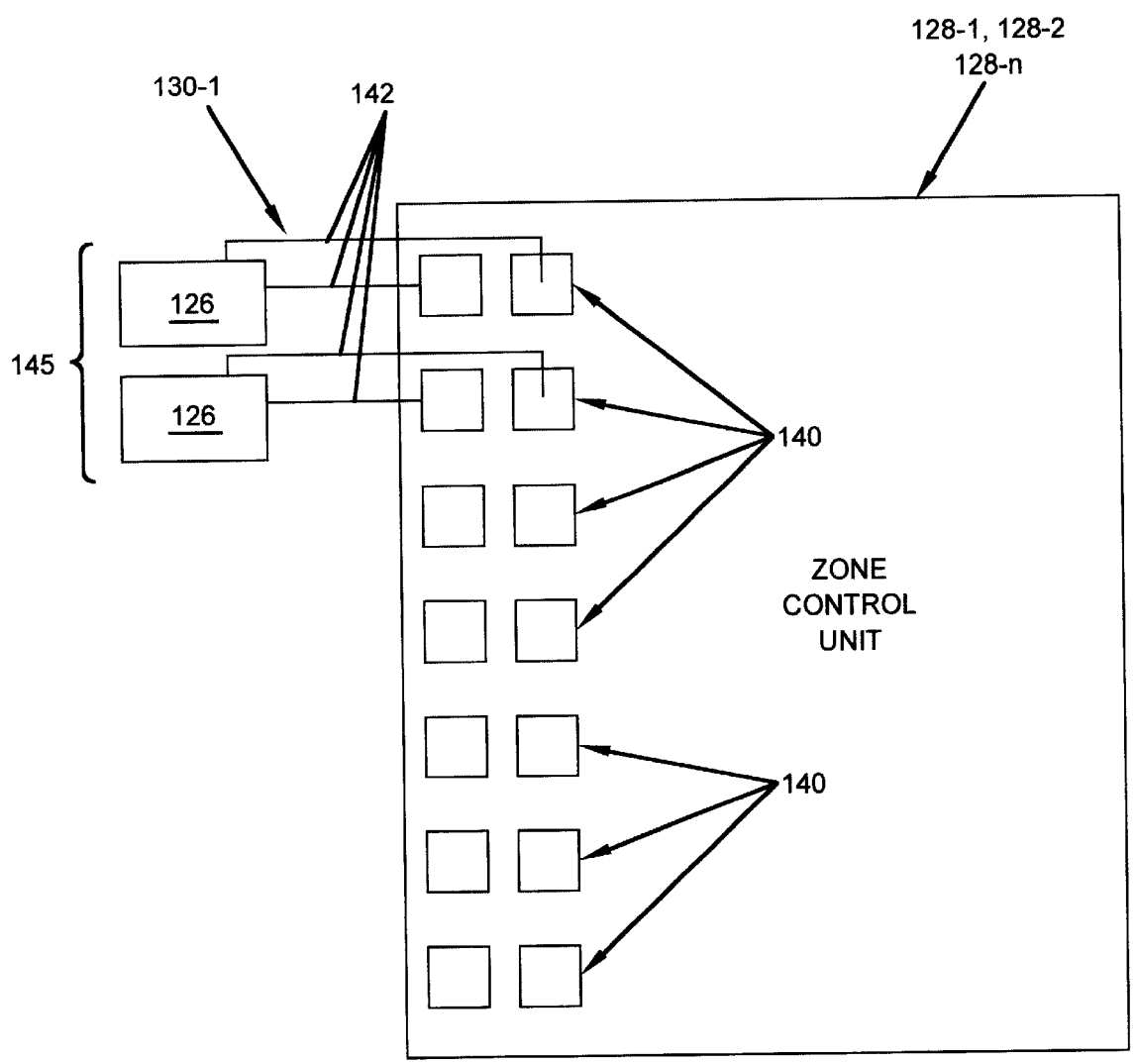

FIGS. 3-1 and 3-2 illustrate one embodiment of an address interface 130-1 for flexible zone control. In the embodiment shown, each zone control unit 128-1, 128-2, 128-n includes a plurality of terminals 140 operably coupled to circuitry of the zone control unit 128-1, 128-2, 128-n. Motor leads 142 from a designated series of motors 144 are connected to terminals 140 of the particular zone control units 128-1, 128-2, 128-n to provide user or operator input to configure the control zone 128-1, 128-2, 128-3 for a desired application. As shown, the designated series of motors 144 illustrated in FIG. 3-1 includes seven (7) motors 126. Thus, in the illustrated embodiment of FIG. 3-1, the designated series of motors 144 are connected to a zone control unit 128 to form a single control zone powering the designated series of motors 144. In FIG. 3-2, the designated series of motors 145 includes two motors 126 coupled to zone control units 128 to form a control zone having a smaller zone length than that illustrated in FIG. 3-1. Motor leads 142 are removably connected to terminals 140 to provide a conveyor system with flexible zone control which is easily adaptable to alternate zone configurations based upon operator configuration.

Figure 4:
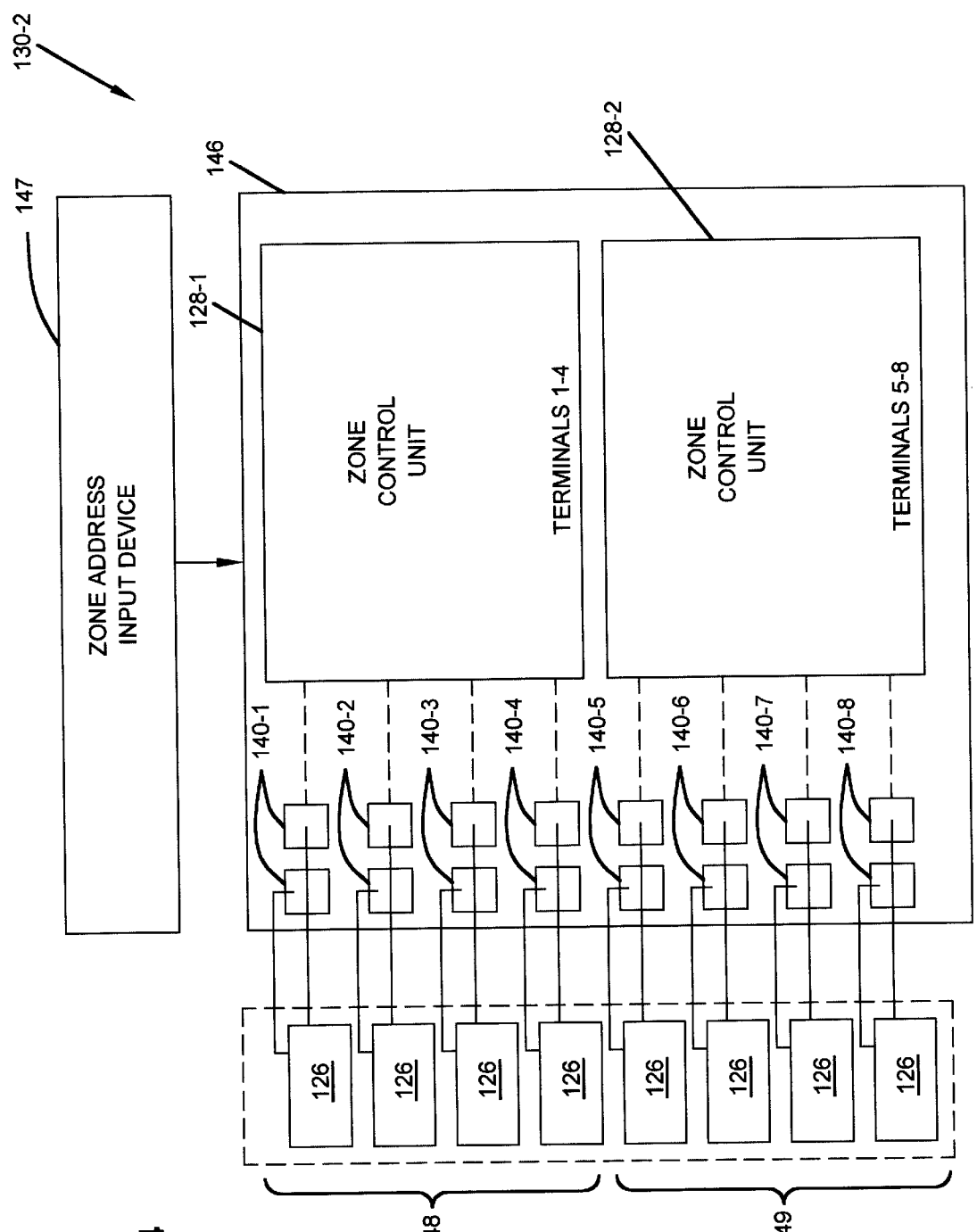
FIG. 4 is a schematic illustration of an alternate embodiment of a user address interface system for flexible zone control.

FIG. 4 illustrates an alternate embodiment of an address interface 130-2 to configure flexible control zones. As shown in FIG. 4, device terminals 140 are coupled to a programmable computer or controller assembly 146. As shown, the address interface includes an operator input device 147 such as a keyboard, scanner or other input device, connected to the computer or controller assembly 146 to configure control zones 128-1, 128-2 to control designate series of motors 148, 149. As schematically shown, the control zones 128-1, 128-2 are programmed to control series of motors 148, 149 coupled to selected device terminals 140. For example, in the embodiment illustrated in FIG. 4, computer or controller assembly 146 is configured to define control zones 128-1 and 128-2 controlling designated motors 148, 149 coupled to terminals (140-1, 140-2, 140-3, 140-4) and terminals (140-5, 140-6, 140-7, 140-8), respectively to programmably configure the control zones 128-1, 128-2.

Figure 5:
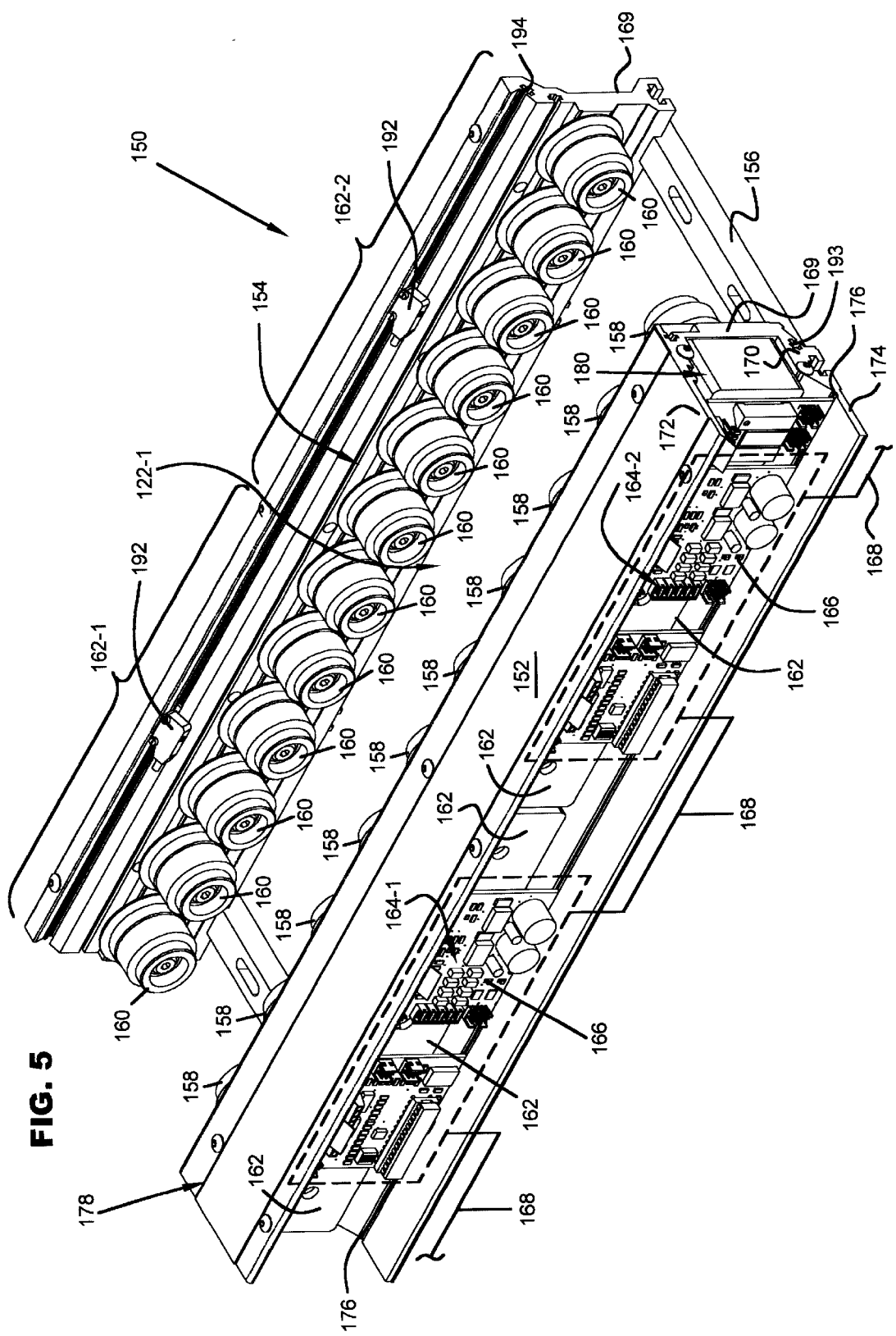
FIG. 5 is a perspective illustration of an embodiment of a conveyor section with flexible zone control.
Figures 1, 5:
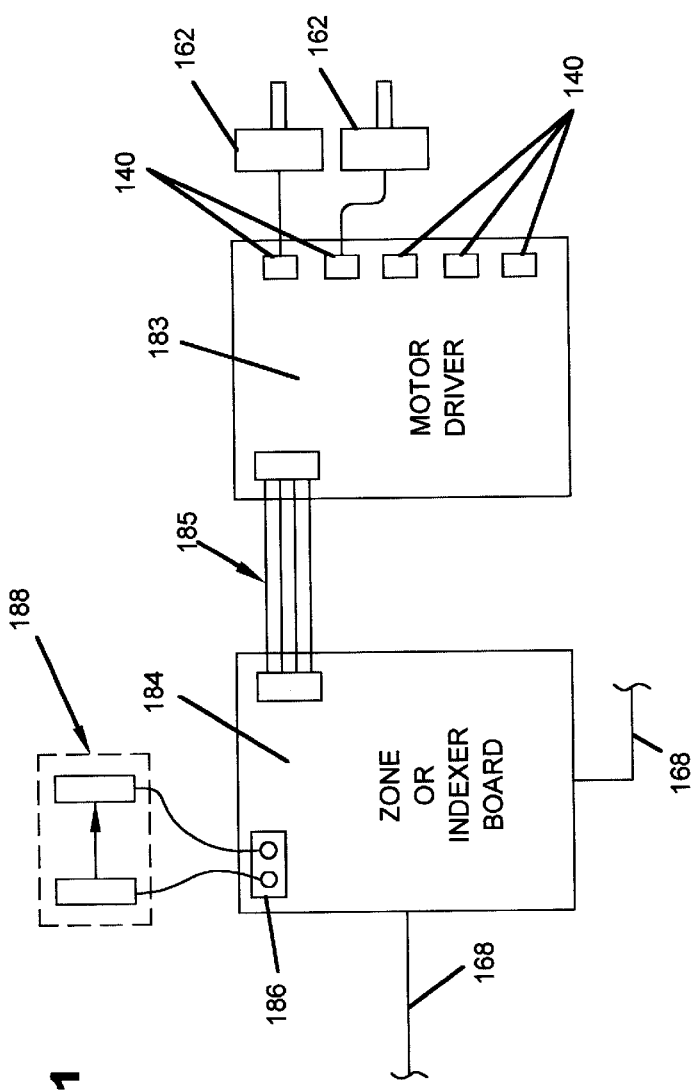
Figures 1, 6:
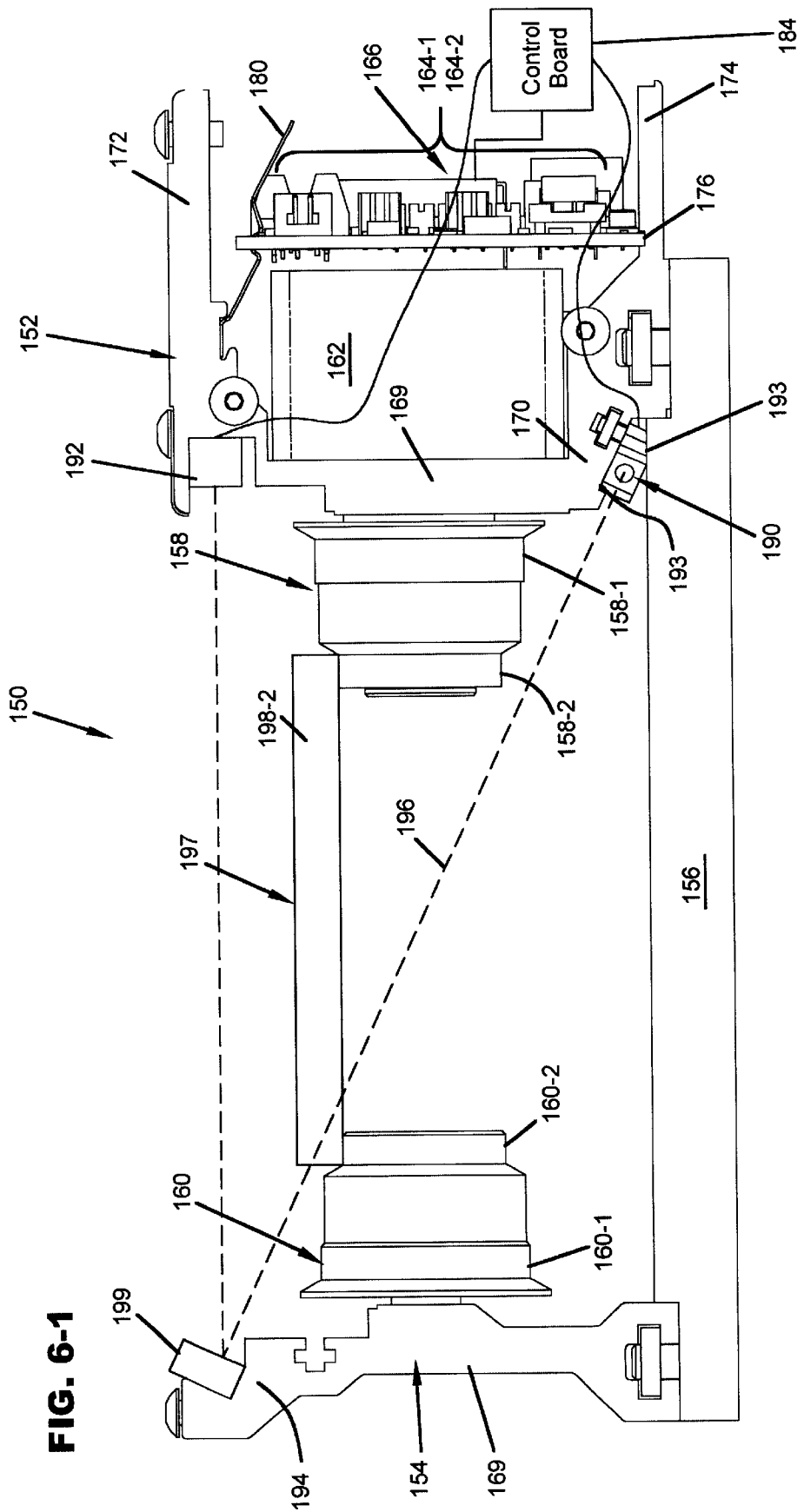
FIG. 6 is an end view of the conveyor section of FIG. 5.

FIGS. 5–6 illustrate an embodiment of a conveyor section 150 incorporating flexible zone control of the present invention. Multiple conveyor sections 150 are connected to form a continuous conveyor path (not shown). As shown, conveyor section 150 includes opposed spaced rails 152, 154 connected by a cross bracket 156. Rails 152, 154 include a plurality of roller wheels 158, 160 spaced therealong which collectively form the rollers 122-1 or rotating conveyor elements of the conveyor system. Application of the present invention is not limited to the particular roller wheels shown or a particular roller design. In the embodiment shown, roller wheels 158 are driven by motors 162 coupled to each of the roller wheels 158 and spaced along rail 152.

The inclusion of a drive motor 162 for each roller wheel 158 provides desired flexibility for adjusting zone length for flexible zone configurations, although application is not limited to the particular embodiment shown. For example, in an alternate embodiment every other roller wheel 158 can be powered by a motor 162. In the illustrated embodiment, roller wheels 160 spaced along rail 154 are idle and are not motor driven. However, in an alternate embodiment, roller wheels 160 could be similarly powered with roller wheels 158 and application is not limited to driven wheels along a single rail 152.

In the embodiment shown in FIG. 5, series of motors 162-1, 162-2 are controlled by local zone control units 164-1, 164-2 supported at spaced locations along rail 152. In the illustrated embodiment, local zone control units 164-1, 164-2 include rigid circuit cards 166 supporting a plurality of motor terminals and control circuitry for localized zone process control. Each zone control unit 164-1, 164-2 is coupled to an adjacent zone control unit 164-1, 164-2 as illustrated by line 168 to coordinate operation between local control zones 164-1, 164-2 so that workpieces are not delivered to a zone unless the zone is ready to receive the workpiece. In the embodiment shown, circuit cards 166 are slideably supported along rail 152 to position cards 166 proximate to the designate series of motors 162-1, 162-2 for flexible zone control. Circuit card 166 could be flexible or formed of a rigid material.

As shown in FIG. 6, rails 152, 154 include an edge portion 169 supporting roller wheels 158, 160. Rail 152 includes a stepped ledge 170 supporting motors 162 along rail 152. Rail 152 also includes upper and lower spaced rail plates 172, 174 extending from edge portion 169. Circuit cards 166 are slideably supported in an elongated slot 176 extending along rail 152 and formed in rail plate 174. Preferably, slot 176 extends between opposed ends 178, 180 of rail 154 as shown in FIG. 5 so that cards 166 can be added or removed from rail 152 as necessary depending upon the desired zone configurations.

Cards 166 are spring biased in slot 176 for operation by spring 182 coupled to upper rail 172 as shown in FIG. 6 to retain the cards 166 in the slot 176. In one embodiment shown in FIG. 5-1, the local zone control units 164-1, 164-2 or cards 166 include a motor driver board 183 having a plurality of motor terminals 140 and a zone indexer board 184 connected to the motor driver board 183 via a ribbon cable 185. Motor driver board 183 and zone indexer board 184 are slidably supported in slot 176. Indexer board 184 includes a terminal connection 186 for a sensor unit 188 (illustrated schematically) for feedback control. Multiple driver boards 183 can be connected to the indexer board 184 with multiple removable ribbon cable connections depending on the desired number of designated motors in the control zone.

Sensor unit 188 is also slideably supported along the conveyor to provide feedback control for the local zone control units 164-1, 164-2 depending upon the particular control zone configuration to provide an adjustable sensor interface or assembly. In the embodiment shown in FIG. 6, sensor unit includes cooperating sensors 190, 192 adjustably supported on rails 152, 154. The sensors 190, 192 are slideably along slots 193, 194 on rails 152, 154 as shown in FIGS. 5–6. The sensors 190, 192 cooperatively transmit and receive signals for detecting the presence of a workpiece along the conveyor path. In the particular embodiment shown, sensor 192 is supported in a raised position relative to a support surface of wheels 158, 160 and sensor 190 is supported below the support surface of wheels 158, 160. Sensors 190, 192 are supported to provide a diagonal path 196 as previously described for a sensor signal transmitted between sensors 190, 192. The diagonal path 196 crosses or intersect a conveyor plane 197 to detect workpiece 198 illustrated diagrammatically regardless of product height or dimension.

Preferably, sensor 192 includes a sensor element that transmits a signal which is detected by sensor 190. Sensor 190 is preferably supported on rail 152 to electrically couple to the zone control unit 164 to provide desired feedback control for the control zone. Alternatively, a single reflective sensor unit can be mounted on rail 152 or 154 to transmit and receive a signal if reflected off a workpiece supported in the transmission path. If the transmitted signal is not detected then there is no workpiece in the transmission path to reflect the transmitted signal. In the embodiment described, the single sensor is mounted on rail 152 to connect to zone control circuitry as described and the transmission path is diagonal to intersect the workpiece regardless of product elevation or height.

In an alternate embodiment shown in FIG. 6-1, rail 152 supports a sensor 190 that transmits a sensor signal and rail 154 supports a mirror 199 to reflect the transmitted signal from sensor 190 to sensor 192 supported on rail 152 as shown. Thus, both sensors 190, 192 are supported on rail 152 for easy connection to control circuitry or board 184 illustrated schematically without extensive wiring across rails. In the embodiment shown, sensor 190 transmits a diagonal signal to mirror 199 which is horizontally reflected to sensor 192, although alternative transmission paths may be employed between sensors 190, 192 and mirror 199 and application is not limited to the specific embodiment shown.

In the embodiment shown in FIGS. 6 and 6-1, roller wheels 158, 160 are adapted to support workpieces 198-1, 198-2 of varied width dimensions for example different form factor disc drives or components. Roller wheels 158, 160 include multiple stepped portions 158-1, 158-2 and 160-1, 160-2. Cooperating stepped portions 158-1, 160-1; and 158-2, 160-2 form recessed conveyor segments for conveying product of incremental widths, for example, different form factor disc drives or components. Thus, as described the position of local zone control units 164-1, 164-2 can be adjusted for different control zone configurations.

Figure 7:
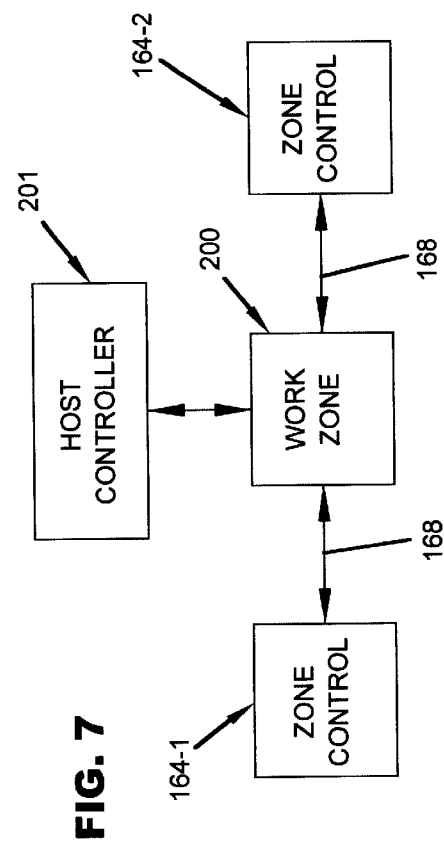
FIG. 7 is a schematic illustration of a work zone operated by a host controller.

Thus, as described, movement of workpieces or units is zoned controlled based upon sensor data or feedback of the control zone and status of adjacent zones. The conveyor moves a workpiece along the conveyor path to different work zones or stations 200 in the embodiment diagrammatically illustrated in FIG. 7. Delivery and removal of the workpiece in the work zone or station 200 is controlled by host controller 201 as shown in FIG. 7. The host controller 201 provides a status signal to receive a workpiece for processing or assembly and provide a status signal that process operations are complete so that the workpiece can continue movement along the zone controlled conveyor path.

In one embodiment, for zone controlled operation or movement of workpieces or units along the conveyor path, motors 162 are energized to accelerate rollers and product along a first portion of the control zone and decelerate motors 162 to decelerate product along a second portion of the control zone. Acceleration and deceleration movement is controlled so that product moves in a smooth fashion within each zone without the use of clutches which can be expensive, large, or in the case of mechanical clutches prone to wear.

As shown in FIG. 8, motors 162 are energized to accelerate a workpiece from an initial position 202 along a first zone segment 203 to a sensor position 204. Thereafter, workpiece is decelerated or slowed along a second zone segment 206 to an end position of the zone 208 to provide a clutchless system. Desired operating parameters such as the acceleration rate-velocity of the workpiece along the first zone segment 203, the sensor position 204 and deceleration rate along the second zone segment 206-stopping distance from the sensor can be programmed for desired zone configurations or control zone length.

Figure 9:
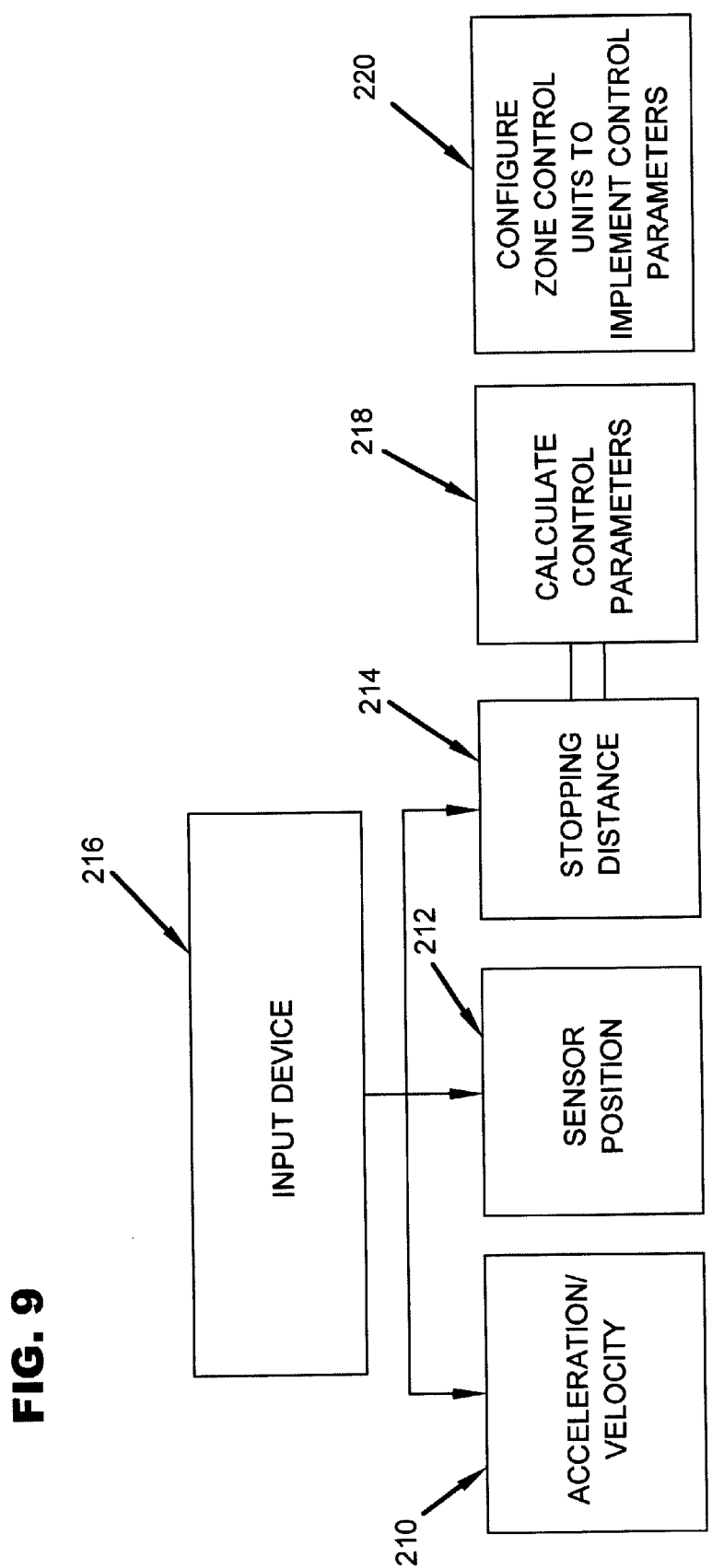
FIG. 9 is a schematic illustration of an embodiment of a flexible zone control system with flexible parameter control.

As illustrated diagrammatically in FIG. 9, operating parameters for acceleration/velocity of the workpiece along the first control segment 203, sensor position 204 and stopping distance from the sensor or deceleration rate along the second control segment 206 can be user defined as illustrated by blocks 210, 212, 214 for flexible control zone configuration via input device 216. A processor calculates control parameters for the motors 162 to accelerate and decelerate the motors in the control zone based upon the inputted operating parameters such as acceleration, velocity, sensor position and stopping distance or length of the second control segment as illustrated by block 218. The processor calculates the control parameters for control segment 208 based upon velocity at the sensor, sensor position, and inputted stopping distance based upon Equations 1 and 2 as follows:

$$\Delta x = \int_{t_1}^{t_2} V_S - V_E \, dt \qquad \text{Eq. 1}$$

$$V_S - V_E = \int_{t_1}^{t_2} d \, dt \qquad \text{Eq. 2}$$

where:
$\Delta x$ is the desired stopping distance;
$V_S$ is the velocity at sensor;
$V_E$ is zero velocity at the zone end position or zero; and
d is the deceleration.

The control parameters for the desired acceleration rate, velocity and deceleration rate are downloaded to the zone control units or control assembly to implement desired zone control as illustrated by block 220.

In illustrated embodiments, the flexible control zones have a uniform zone length along the conveyor path 124. As described, the uniform zone length can be adjusted by adjusting the connection of motor leads to terminals on the motor driver or zone control boards or in an alternate embodiment programmably defined and adjusted based upon desired operating parameters as illustrated in FIG. 4. In illustrated embodiments the control zones have a uniform length.

Figure 10:
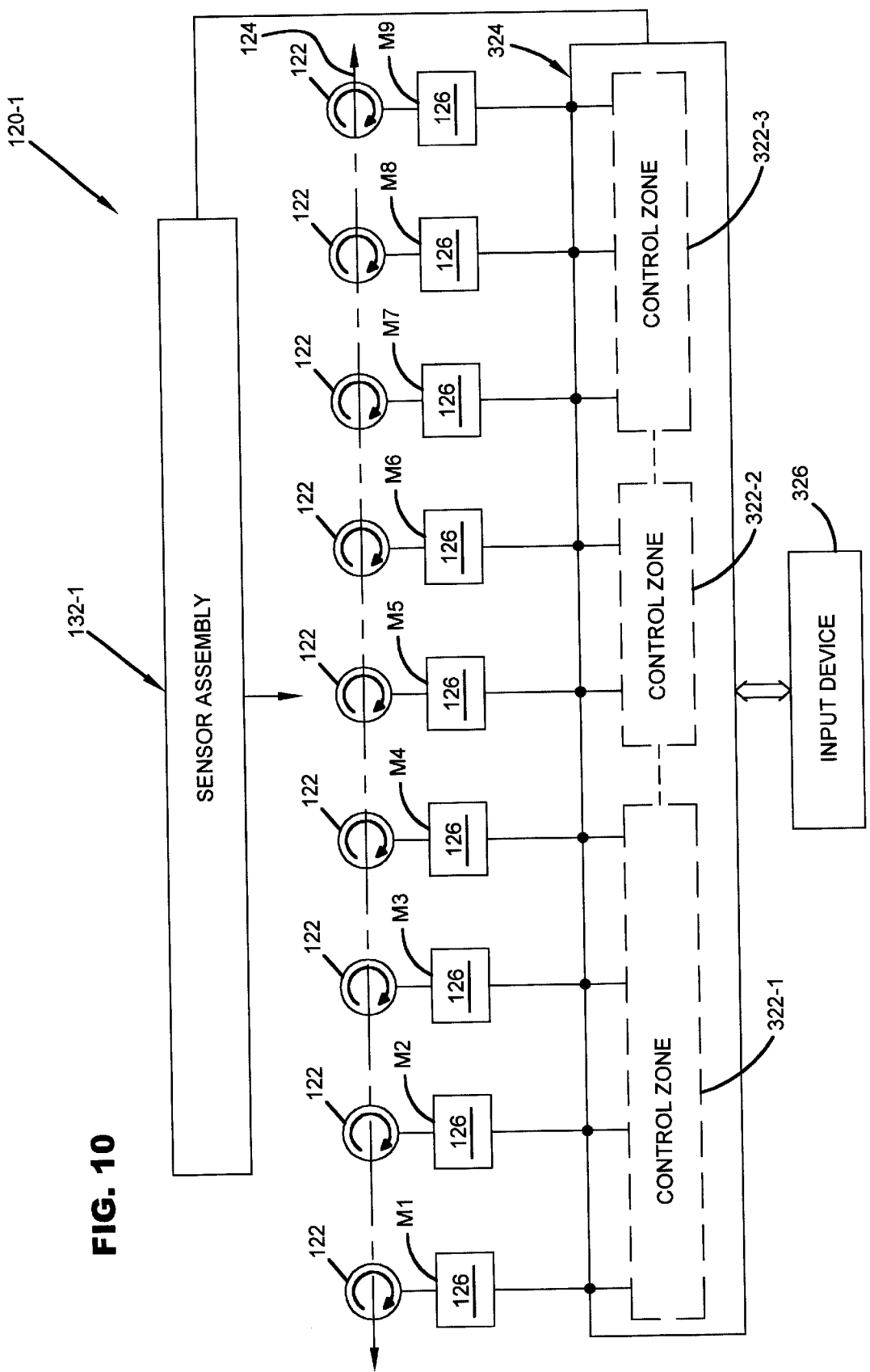
FIG. 10 schematically illustrates an embodiment of a flexible zone control system including a non-uniform zone length.

FIG. 10 schematically illustrates an embodiment of a flexible control assembly including control zones having non-uniform zone lengths along the length of the conveyor path 124 where like numbers are used to refer to like parts in the previous FIGS. In particular, as shown, the conveyor system 120-1 in FIG. 10 includes a plurality of control zones 322-1, 322-2, 322-3 having a non-uniform zone length to accommodate varied workpiece or unit sizes or lengths. As shown, motors 126 rotate rollers 122 (or roller wheels in the particular embodiment illustrated in FIG. 5) to convey workpieces along the conveyor path 124. In the illustrated embodiment, the zone control assembly 324 energizes motors 126 (M1–M9) via control zones 322-1, 322-2, 322-3 to convey workpieces along the conveyor path 126 In the illustrated embodiment the zone control assembly 324 includes an input device 326 to configure the control zones. For example, the input device 326 can be a keyboard, scanner etc. to input zone parameters to configure the control zones. In the illustrated embodiment, the system is configured to define control zone 322-1 to control motor series M1–M4, control zone 322-2 to control motor series M5–M6 and control zone 322-3 to control motors series M7–M9. As schematically shown, the system includes a sensor assembly 132-1 to control operation of the control zones for conveying workpieces along the conveyor path.

Figure 11:
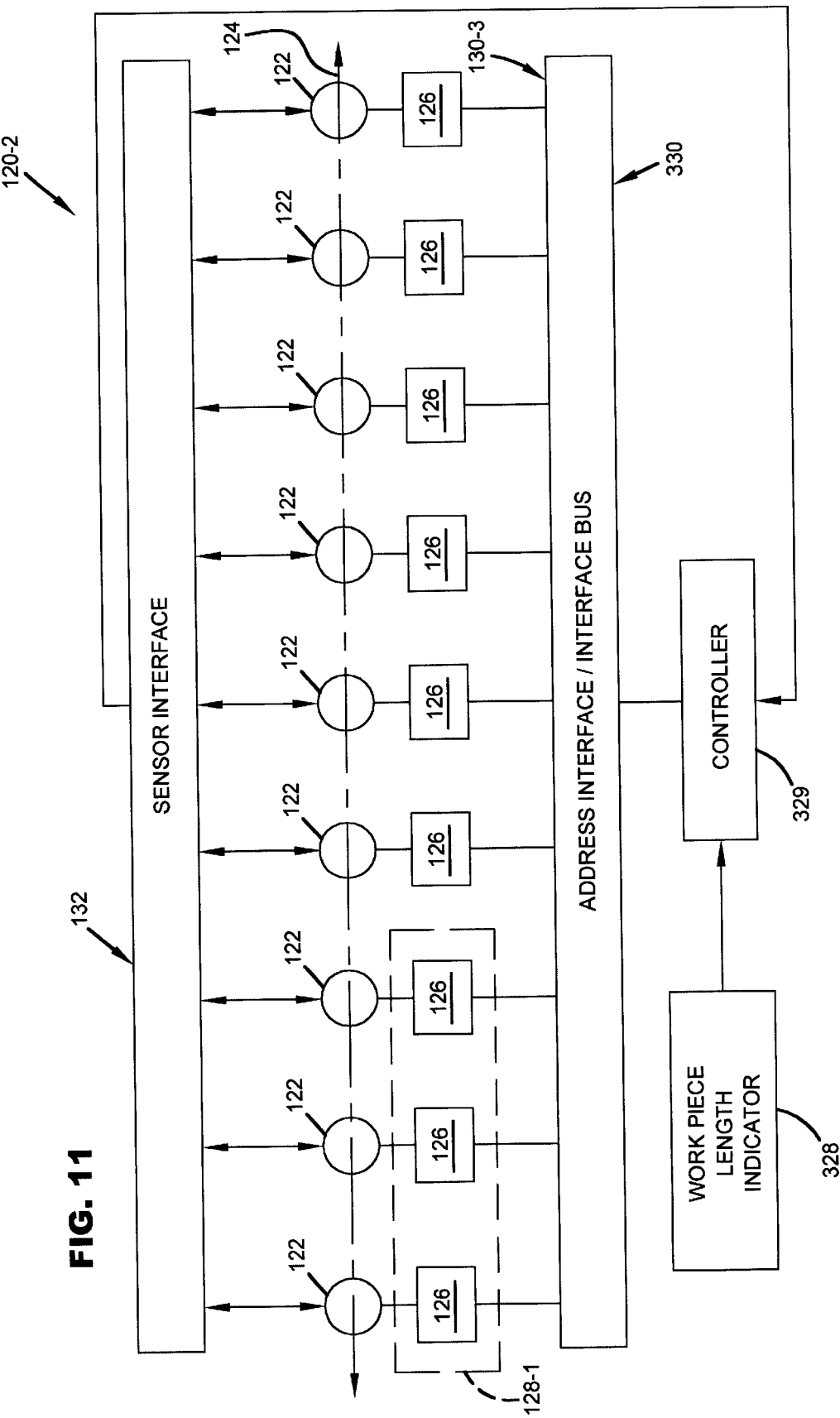
FIGS. 11–12 schematically illustrate embodiments of a flexible zone control system configurable based upon workpiece length or size.
Figure 12:
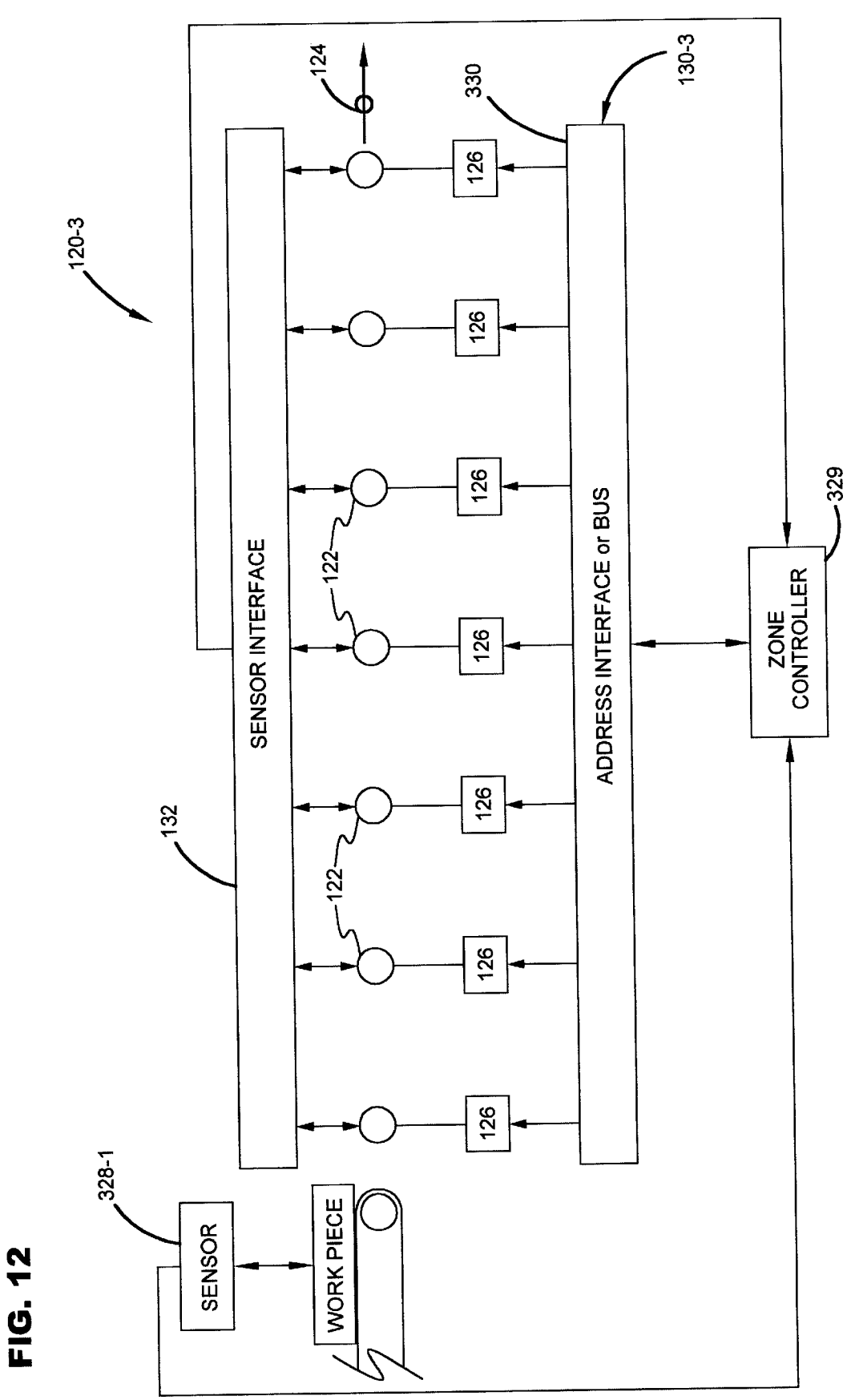

FIG. 11 illustrates an embodiment of a virtual control system 120-2 which configures virtual control zones based upon input from a workpiece length or size indicator or input device 328 where like numbers are used to refer to like parts in the previous FIGS. A virtual control zone for the purpose of this description means one or more of the rollers cooperating in response to a control scheme to define a control zone along the conveyor. As shown, the indicator 328 provides input parameters to controller 329 to define control zones through address interface 130-3. In particular the address interface 130-3 includes a serial bus or interface bus 330 and the motors 126 are coupled to the serial bus or interface bus 330 and include a unique bus address. The control zones are defined for the plurality of motors based upon the indicator 328 and the bus address for each of the plurality of motors along the bus 330. In an alternate embodiment 120-3 illustrated in FIG. 12 the control zones are configured based upon workpiece length or size via sensor 328-1 upstream of the conveyor assembly as shown. The control embodiments 120-2, 120-3 can be configured to provide dynamic zone control as will be described or configured based upon programmed zone length parameters or alternate input parameters.

Figure 13:
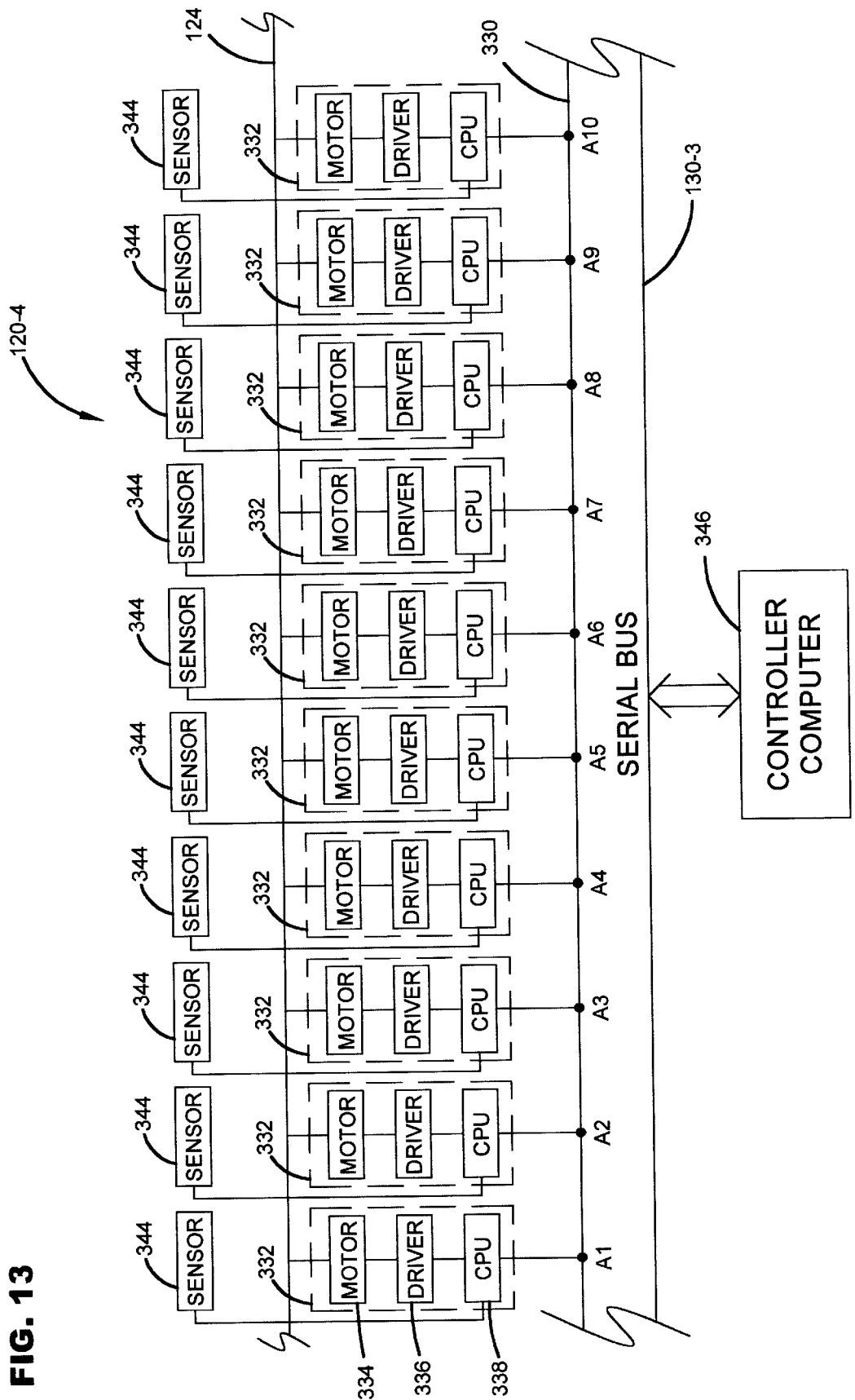
FIG. 13 schematically illustrates an embodiment of a flexible control system including a plurality of sensors and controllers to provide dynamic zone control.

FIG. 13 illustrates an embodiment of a control system 120-4 for zone control. As shown, the system 120-4 includes a plurality of motor assemblies 332 along the conveyor path 124. The motor assemblies 332 include motors 334 operably via drivers 336 to rotate or operate rollers (not shown) along the conveyor path 124. In the illustrated embodiment, each assembly 332 includes a controller or computer 338 to form "smart" motors. The motor assemblies 332 are coupled to a serial bus or interface bus 330 to define the address interface to define a plurality of control zones In the illustrated embodiment sensors 344 provide control feedback to the controller 338 for motors 344 to dynamically configure traveling control zones for a particular workpiece as that workpiece is conveyed along the conveyor path. For example in one configuration, motors 334 having a bus address A1–A5 defined a first control zone and motors 334 having a bus address A6–A10 define a second control zone or, in alternate embodiments, different series of motors can be configured to define the first and second control zones to provide flexible zone control.

In the illustrated embodiment, the control system 120-4 includes a sensor 344 coupled to each motor 334 or controller 338 to provide dynamic or traveling zone control for conveying workpieces of different lengths and sizes. The control zones are configured based upon the size or dimension of particular workpieces and desired workpiece spacing or operating parameters along the conveyor path. In particular, the system is configured to dynamically adjust the zone configuration as a workpiece or unit travels along the conveyor path to accommodate workpieces of different sizes. In the illustrated embodiment a system controller 346 is coupled to the serial bus or interface 330. Operating parameters for each of the controllers 338 or system can be globally changed or defined through controller 346.

Figure 14:
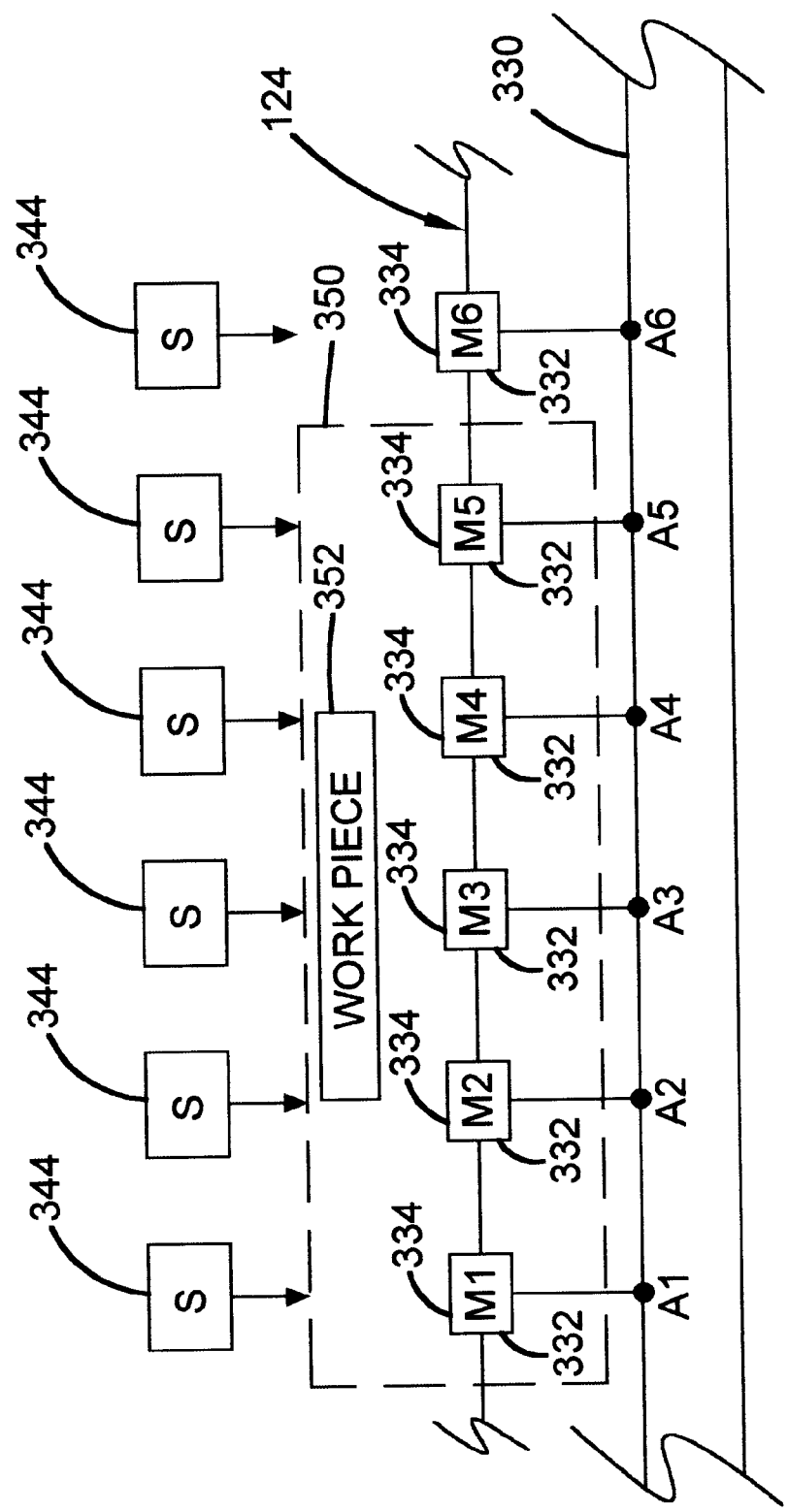
FIGS. 14–15 schematically illustrate an embodiment of a flexible zone control system having automatic zone configuration for dynamic or travelling zone control.
Figure 15:
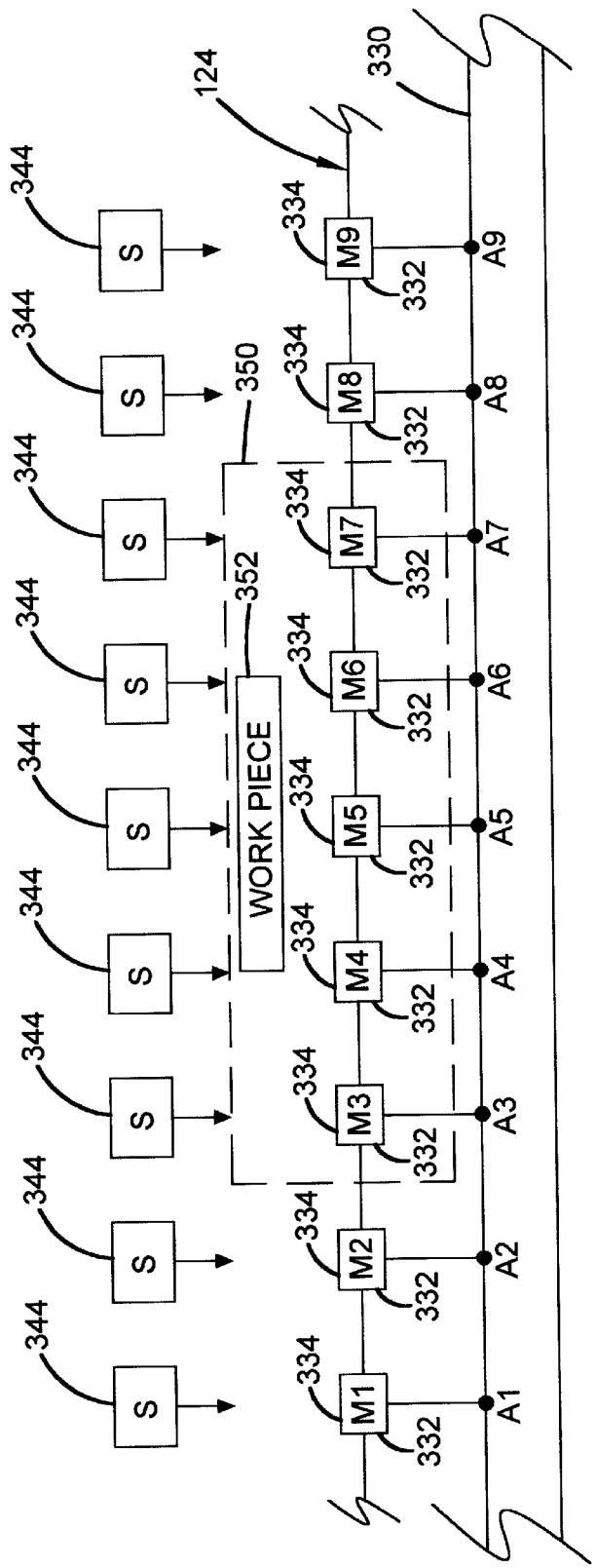

As illustrated in FIGS. 14–15, the control zones are configured based upon feedback from sensors 344. In particular, in one embodiment, bus addresses A1–A5 for motors M1–M5 form a dynamic control zone 350 for workpiece 352. The control zone 350 is configured based upon sensor 344 feedback which detects the presence and length or size of the workpiece 352 along the conveyor path 124. The address configurations for control zone 350 are dynamically updated or reconfigured as the workpiece or unit 352 moves along the conveyor path as comparatively illustrated in FIGS. 14–15.

The length and size of the control zone 350 is configured based upon the length or size of the workpiece 352, desired spacing between workpieces and desired operating parameters The control zone 350 for workpiece 352 is configured or reconfigured based upon the zone parameters for the workpiece 352 (i.e., size, length of the workpiece and desired spacing or operating parameters) and a control status for motors M1–M6 (i.e., whether the motor is assigned to a particular control zone) along the conveyor path 124. In particular as shown in one embodiment, the control zone 350 for workpiece or unit 352 includes motors M1–M5 having a bus address A1–A5 and in an updated configuration the control zone 350 for workpiece 352 includes motors M3–M7 having a bus address A3–A7 to provide dynamic or "traveling" zone control.

Thus as described, the controller or control assembly automatically configures the control zones 350 for workpieces or units 352 as the workpieces or units 352 travel along the conveyor path based upon feedback from sensors and desired spacing or zone parameters. For example, the control zone 350 is reconfigured or updated based upon the control status for each bus address to provide the desired zone length for the workpiece and desired spacing between workpieces in adjacent zones.

In the illustrated embodiments, each motor 334 includes a sensor 344 to provide optimum resolution or zone control although application is not so limited and sensor may be spaced along the conveyor path to align with alternate motors 334 or other spacing arrangements. Increased spacing between sensors decreases control resolution and generally increases required spacing separating workpieces for maintaining conveyor control. Sensors 344 can include sensor assemblies illustrated in FIGS. 6 and 6-1 or alternate devices or scanners for providing feedback for dynamic or traveling "zone control" and application is not limited to the specific embodiments disclosed. Furthermore, application is not limited to the specific embodiment shown and control zones for motor assemblies 332 can be configured based upon programmed control parameters through alternate input devices such as, without limitation, a keyboard, scanner, bar code scanner or optical device as previously described.

The present invention relates to a conveyor system with flexible zone parameter control which provides flexibility for use with different products or workpieces having different dimensions and sizes. The conveyor system includes a zone control assembly to configure zone control units or control zones (such as 128, 164, 322, 350) to provide flexible zone parameters for conveying products or units. In illustrated embodiments, a plurality of control zones are formed along the conveyor path 124 having a uniform or non-uniform zone length. The plurality of control zones are configured via an address interface (such as 130, 330) via devices (such as 147, 326, 328, 344) or leads (such as 142).

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application while maintaining substantially the same functionality without departing from the scope and spirit of the present invention. In addition, although the preferred embodiment described herein is directed to a disc drive system, it will be appreciated by those skilled in the art that the teachings of the present invention can be applied to other systems without departing from the scope and spirit of the present invention. In particular, although a particular number of control zones are illustrated in the FIGS, the FIGS are illustrative only and application of the present invention is not limited to any particular configuration shown.

What is claimed is:

1. A conveyor system for conveying a workpiece comprising:
    a plurality of rollers spaced along a conveyor path and operable via a plurality of motors coupled to the plurality of rollers along the conveyor path and the plurality of motors being separately identifiable via unique motor addresses;
    an address interface coupled to the plurality of motors; and
    a control assembly coupled to the address interface to configure a control zone to control a series of the plurality of motors based upon corresponding motor addresses for the series of the plurality of motors.

2. The conveyor system of claim 1 wherein the control assembly includes an input device to programmably configure the control zone based upon the corresponding motor addresses for the series of the plurality of motors.

3. The conveyor system of claim 1 wherein the control assembly includes a plurality of control units coupled to the plurality of motors.

4. The conveyor system of claim 1 including a plurality of control zones along the conveyor path.

5. The conveyor system of claim 4 wherein the plurality of control zones are configured to have a uniform zone length.

6. The conveyor system of claim 4 wherein the plurality of control zones are configured to have a non-uniform zone length.

7. The conveyor system of claim 1 including a plurality of sensors along the conveyor path coupled to the control assembly to configure the control zone.

8. The conveyor system of claim 7 wherein the control assembly dynamically configures the control zone based feedback from the plurality of sensors.

9. The conveyor system of claim 7 wherein each of the plurality of motors along the conveyor path includes a sensor coupled thereto.

10. The conveyor system of claim 7 wherein the plurality of sensors detect a presence of workpieces along the conveyor path to provide address locations for the workpieces along the conveyor path to dynamically configure a plurality of control zones along the conveyor path.

11. The conveyor system of claim 10 wherein the plurality of control zones are configured based upon a length of the detected workpieces along the conveyor path and desired spacing of the workpieces along the conveyor path.

12. The conveyor system of claim 10 wherein the control assembly configures the plurality of control zones for the workpieces based upon the address locations for the workpieces and control status for each of the plurality of motors.

13. A conveyor system comprising:
    a plurality of rollers spaced along a conveyor path and operable via a plurality of motors coupled to the plurality of rollers along the conveyor path and a plurality of control units coupled to the plurality of motors; and
    an interface bus and the plurality of control units coupled to the interface bus and having a unique bus address and the plurality of control units being configured to define at least one control zone comprising a designated series of the plurality of control units.

14. The conveyor system of claim 13 including an input device to programmably configure zone parameters for the at least one control zone.

15. The conveyor system of claim 13 including a plurality of control zones and the plurality of control zones are configured based upon a control status for each of the plurality of motors along the conveyor.

16. The conveyor system of claim 13 including a plurality of drivers coupled to the plurality of motors and the plurality of control units to operate the plurality of motors based upon signals from a corresponding control unit.

17. The conveyor system of claim 13 including a plurality of sensors coupled to the plurality of control units and the at least one control zone is configured based upon feedback from the plurality of sensors.

18. The conveyor system of claim 17 wherein the plurality of sensors provide feedback regarding workpiece position and the at least one control zone is dynamically configured based upon the workpiece position and a control status of the plurality of motors.

19. The conveyor system of claim 17 wherein each of the plurality of control units includes a sensor coupled thereto.

20. A method for conveying a workpiece along a conveyor path comprising steps of:
    programmably configuring a control zone to control a plurality of motors coupled to a plurality of rollers along a conveyor path through a zone control interface coupled to the plurality of motors; and
    conveying the workpiece along the conveyor path via operation of the control zone.

21. The method of claim 20 wherein the step of programmably configuring the control zone comprises:
    inputting operating parameters of the control zone to configure the control zone to control a designated series of the plurality of motors.

22. The method of claim 20 including a plurality of control zones along the conveyor path and comprising the steps of:
    programmably configuring the plurality of control zones to a first zone configuration for a first application based upon operator inputted parameters; and
    programmably configuring the plurality of control zones to a second zone configuration for a second application based upon the operator inputted parameters.

23. The method for conveying the workpiece of claim 20 wherein the control zone includes a plurality of drivers to operate the plurality of motors and a plurality of control units coupled to the zone control interface to control the plurality of drivers.

24. A method for conveying a workpiece along a conveyor path comprising steps of:

configuring a first control zone for a workpiece to control a first series of drivers coupled to a first series of motors along a conveyor path through a control interface or interface bus; and configuring a second control zone for the workpiece to control a second series of drivers coupled to a second series of motors as the workpiece moves along the conveyor path through the control interface or interface bus.

25. The method of claim 24 and the step of configuring the first and the second control zones comprises:

providing a plurality of sensors along the conveyor path; and configuring the first and second control zones based upon feedback from the plurality of sensors.

26. The method for conveying the workpiece of claim 24 wherein the first and second control zones include a plurality of control units coupled to the control interface or interface bus and plurality of drivers to configure the first and second control zones through the control interface or interface bus.

27. The method of claim 26 including a plurality of sensors coupled to the plurality of control units to provide feedback to configure the first and second control zones.

28. The method of claim 24 wherein the steps of configuring the first and second control zones comprises the steps of:

determining workpiece position along the conveyor path; and configuring the first and second control zones based upon the workpiece position and a control status of the plurality of motors.

29. The method of claim 28 wherein the conveyor path includes a plurality of sensors spaced along the conveyor path and the step of determining the workpiece position comprises:

detecting the workpiece along the conveyor path via feedback from the plurality of sensors.

30. The method of claim 28 wherein the first and second control zones are configured based upon defined control parameters or desired spacing between workpieces along the conveyor path.

31. A conveyor system comprising:

a plurality of rotating conveyor elements spaced along a conveyor path and a plurality of motors to operate the plurality of conveyor elements along the conveyor path; and a control system including a control input device and a zone control interface coupled to the plurality of motors and the control system configured to define at least one control zone including a designated series of the plurality of motors and the at least one control zone being configured based upon control input from the control input device through the zone control interface.

32. The conveyor system of claim 31 including a plurality of drivers coupled to the plurality of motors and the at least one control zone operating the plurality of drivers based upon control input through the zone control interface.

33. The conveyor system of claim 31 wherein the control system includes a plurality of control units coupled to the plurality of motors and the zone control interface and the at least one control zone includes a designated series of the plurality of control units to control the designated series of the plurality of motors.

* * * * *